United States Patent [19]
Brown

[11] Patent Number: 4,853,875
[45] Date of Patent: Aug. 1, 1989

[54] IMAGE-CAPABLE INTERPROCESSOR LINK COMMUNICATIONS PROTOCOL

[75] Inventor: Robert W. Brown, Batavia, N.Y.

[73] Assignee: Eastman Kodak Company, Rochester, N.Y.

[21] Appl. No.: 145,842

[22] Filed: Jan. 19, 1988

[51] Int. Cl.[4] ............................................. G06F 15/16
[52] U.S. Cl. ..................................... 364/514; 364/200; 364/900; 340/825.51
[58] Field of Search ................. 364/517, 200, 900; 340/825.51, 825.52; 379/90; 375/8; 358/256

[56] References Cited

U.S. PATENT DOCUMENTS

| | | | |
|---|---|---|---|
| 3,934,232 | 1/1976 | Curley et al. | 364/200 |
| 4,150,438 | 4/1979 | Sorey et al. | 364/900 |
| 4,214,305 | 7/1980 | Tokita et al. | 364/200 |
| 4,387,427 | 6/1983 | Cox et al. | 364/200 |
| 4,412,285 | 10/1983 | Neches et al. | 364/200 |
| 4,628,504 | 12/1986 | Brown | 370/85 |
| 4,648,061 | 3/1987 | Foster | 364/900 |
| 4,649,473 | 3/1987 | Hammer et al. | 364/200 |
| 4,667,191 | 11/1987 | Hessel | 340/825.5 |
| 4,683,530 | 7/1987 | Quatse | 364/200 |
| 4,707,693 | 11/1987 | Hessel | 340/825.51 |
| 4,718,002 | 1/1988 | Carr | 364/200 |
| 4,727,479 | 2/1988 | Kirrmann | 340/825.31 |
| 4,783,657 | 11/1988 | Bouchard et al. | 340/825.52 |

OTHER PUBLICATIONS

Duane Elms, Owen Nelson and Alan Roghlauf, "A Medical Imaging Equipment Digital Image Transfer Interface Standard", Application of Optical Instrumentation in Medicine XII: Medical Image Production, Processing, Display and Archiving, Ed. Roger H. Schneider and Samuel J. Dwyer III, Proc. SPIE 454 (1984), 86–90.

E. Alzner, G. Arink, F. W. Gutzwiller, K. C. Menke and M. F. Rossi, "A Standard Product Interface for Digital Medical Imaging Equipment", Medical Images and Icons, Medpacs: Picture Archiving and Communications Systems, Medpics: Picture Interpretation Computers and Systems, Medgraph: Computer Graphics, Ed. Andre J. Duerinckz, Judith Prewitt and Murray Lowe, Proc. SPIE 515 (1984), 129–135.

S. C. Horii, J. L. Lehr, G. S. Lodwick, Y. Wang and J. S. Zielonka, "Overview of ACR-NEMA Digital Imaging and Communication Standard", 3rd International Conference and Workshop on Picture Archiving and Communications Systems (PACS III) for Medical Applications, Ed. Roger H. Schneider and Samuel J. Dwyer III, Proc. SPIE 536 (1985), 132–138.

Primary Examiner—Parshotam S. Lall
Assistant Examiner—Ellis B. Ramirez
Attorney, Agent, or Firm—Thomas H. Close

[57] ABSTRACT

An image-capable interprocessor link communications protocol, includes a generalized set of communications rules designed to handle the large amounts of transmitted data and the high transfer speeds often associated with image-capable communications. These rules are designed to facilitate the exchange of image information across an interprocessor link without modifying or massaging it and without adding extraneous control information to it.

7 Claims, 4 Drawing Sheets

IMAGE-CAPABLE INTERPROCESSOR LINK COMMUNICATIONS PROTOCOL

A portion of the disclosure of this patent document contains material to which a claim of copyright protection is made. The copyright owner has no objection to the copying of the patent document or the patent disclosure, but reserves all other rights.

BACKGROUND OF THE INVENTION

1. Field of the Invention

The invention relates to a communications protocols for transmitting image data between processors over an interprocessor link.

2. Description of the Prior Art

INTRODUCTION TO IMAGE-CAPABLE COMMUNICATIONS

The concern for how image information is transferred from place to place has grown with the increasing importance of image processing. Disciplines such as astronomy, defense systems technology, graphics, geophysics, medical and X-ray technology, and photographic science, rely upon the ability to communicate digital image data effectively. Despite the increased focus on image-capable communications, there has hitherto been little progress toward the development of a basic set of image-capable communications rules. Without a set of generalized communications guidelines, image-capable interfaces have had to be customized. This customization poses problems for systems development and integration. For instance, the effort needed to develop one image-capable interface may have to be duplicated during the subsequent development of similar interfaces. Also, systems that hae been designed independently are often difficult to integrate together, although they may be functionally compatible, due to incompatibilities between their communications protocols. Hence, customized interface designs may be quite useless for developing additional interface applications or integrating with similar systems.

Before describing some of the preceding customized approaches to developing image-capable interfaces, a brief introduction to this area of communications is presented. In order to provide the appropriate background, the first section of the following discussion presents interfaces in terms of interprocessor links and protocols. Next, image-capable link requirements are discussed. Then image-capable protocols and the customization problems from a historical perspective are discussed.

INTERPROCESSOR LINKS AND PROTOCOLS

Whenever two processors are interfaced together, an interprocessor link is formed that loosely couples the systems by providing a mechanism for the transfer of data and control information. Typically, interprocessor links are constructed by connecting two or more systems to some type of communications medium through system interface modules, which operate under the independent control of their host processors. Though the processors are interfaced together, their system independence requires the implementation of a governing set of rules and conventions to ensure reliable communications over the link. Such a set of procedures and formats, which are mutually agreed upon for the purpose of providing communications, are collectively referred to as a protocol. Often, in order to increase flexibility and simplify design, protocols are layered together. Regardless of how control is organized, protocols, which apply of both the hardware interface and the controlling software, must be designed to maintain communications in support of the speed, efficiency, and service requirements of the link.

For example, protocols are sometimes required to include downloading services for transferring and controlling software modules across a link. Such functionality is necessary for those systems that are incapable of archiving additional protocol layers or applications. Without download protocols, these systems would not be able to function. Unfortunately, as is the case with most link services, downloading results in additional communications overhead. This overhead originates from the extra control messages and/or header bits needed to distinguish the data and control associated with a particular service from the other information being sent across the link. Therefore, as link services are added, overhead increases, which may adversely impact system performance and prevent the fulfillment of all link requirements.

IMAGE-CAPABLE LINK REQUIREMENTS

As shown in table 1, there are three main requirements for supporting image-capable interprocessor link communications. First, the number of records transmitted per image must be accommodated. This number can be quite large, as an image may consist of a consecutive stream of thousands of equally sized records. Second, the size of image records must be handled. Again, this can be a significant amount, since each image record may be on the order of thousands of bytes in size. Third, the speed at which image data is to be transferred must be supported. While transfer speeds are typically on the order of millions of bits per second, rates can be obtained that are thousands of times higher. Often these rates are sustained by some real time device, such as an image scanner that continually produces a steam of unbuffered data, or a drum printer that requires continuous input of digital data. Thus, an image-capable interprocessor link can potentially be required to support the transmission of millions of bits of image information at some real time data rate.

TABLE 1

| IMAGE-CAPABLE COMMUNICATIONS REQUIREMENTS |
|---|
| 1. LARGE NUMBER OF RECORDS - Thousands of records per image |
| 2. LARGE RECORD SIZE - Thousands of bytes per record |
| 3. REAL TIME SPEED - Millions of bits per second |

Along with these three main requirements, an image-capable interprocessor link is also typically required to support any of a number of link services. Such services include remote image access, downloading, image security, compression, and a variety of other functions. Though various systems have successfully fulfilled the image-capable communications and service requirements, a generalized interprocessor link protocol for image communications has not yet been implemented. In fact, most imaging equipment has been customized in order to meet specific device requirements and functionality. Such customization is not only wasteful, but it hinders the transportability of devices and the interconnectability of systems.

HISTORICAL PERSPECTIVES

Over the last ten years, engineers at Eastman Kodak Company have successfully implemented numerous image-capable interfaces. Oftentimes, these interfaces have been constructed using customized data channels, electrical circuitry, and control software. The Dicomed D47 Image Recorder, the Dicomed D48 Image Recorder, the Optronics Colormation C-4500, and several custom-made devices, have been interfaced to computers at Kodak. Though image communications were realized, the inherent interface customization has resulted in a great deal of unnecesasry effort to be expended in repeatedly performing similar work.

In 1984, Elms, Nelson, and Rothlauf (Picker International) developed an image transfer interface standard in an attempt to ease the effort required to implement image communications systems. See, Elms, Duane, Owen Nelson and Alan Rothlauf, "A Medical Imaging Equipment Digital Image Transfer Interface Standard." APPLICATION OF OPTICAL INSTRUMENTATION IN MEDICINE XII: MEDICAL IMAGE PRODUCTION, PROCESSING, DISPLAY AND ARCHIVING. Ed. Roger H. Schneider and Samual J. Dwyer III. Proc. SPIE 454 (1984), 86–90. The imaging equipment interface they described consisted of a serial RS-232-C control channel and a high speed 16-bit parallel direct memory access (DMA) data channel for connecting any imaging equipment device to a network interface. Details of their protocol standard included 4096-byte fixed length data records, a specified 32 Mbps data capacity, ASCII control commands and responses, control channel protocol, data channel protocol, electrical layout, and an image header specification. Indeed, this image transfer interface standard addressed many low level protocol requirements for image communications.

Also in 1984, Philips Medical systems publicized a proposed standard product interface for digital medical imaging equipment. See, Alzer, E., G. Arnik, F.W. Gutzwiller, K.C. Menke and M.F. Rossi. "A Standard Product Interface for Digital Medical Imaging Equipment." MEDICAL IMAGES AND ICONS, MEDPACS: PICTURE ARCHIVING AND COMMUNICATIONS SYSTEMS, MEDPICS: PICTURE INTERPRETATION COMPUTERS AND SYSTEMS, MEDGRAPH: COMPUTER GRAPHICS. Ed. Andre' J. Duerinckx, Jidth Prewitt and Murray Lowe, Proc. SPIE 515 (1984), 129–135. This proposed interface consisted of three protocol layers designed to connect imaging equipment together or to networks. Physical and data link layers were organized to provide combined support for reliable network-independent communications over an interprocessor link. Above these two lower layers, a communications package layer was positioned to act as an interface to imaging devices or to client systems. Basic functions, including initialization, resource management, communication information presentation, and message transmission and reception, were specified to promote the exchange of image information. These communications package functions were designed to handle messages in a standard format consisting of (1) a fixed communications section for indicating message priority, size, source, and destination; (2) a fixed command section for specifying a unique object and action, which give meaning to the data and instructions for its use; and (3) a variable data section for conveying user information. In this manner, the proposed standard product interface provided a general mechanism for connecting imaging equipment.

Similarly, in 1985, the ACR-NEMA Digital Imaging and Communication Standard was developed as a layered architecture for connecting imaging equipment together and to networks. See, Horii, S.C., J.L. Lehr, G.S. Lodwick, Y. Wang and J.S. Zielonka. "Overview of ACR-NEMA Digital Imaging and Communication Standard." 3rd INTERNATIONAL CONFERENCE AND WORKSHOP ON PICTURE ARCHIVING AND COMMUNICATIONS SYSTEMS (PACS III) FOR MEDICAL APPLICATIONS. Ed. Roger H. Schneider and Samuel J. Dwyer III. Proc. SPIE 536 (1985), 132–138. A physical layer was specified, including cable pinouts for 16-bit parallel data transfer and asynchronous control. Though the hardware was targeted to produce only 17 errant bits per billion transferred at 8 MBps over a cable length of 15 meters, other physical systems were permitted. Flow control and error checking was handled by a data link-media access layer, which also encapsulated each data block with frame number, sequence check, and frame descriptor words. Above this layer, a network/transport layer divided messages into data blocks consisting of a sequence number word, a block descriptor word, and a maximum of 2040 words of data. A fourth layer, the session layer, handled primitive requests, responses, and commands to support the higher level presentation and application layers. As in the previously discussed standards, the connection of imaging equipment was readily facilitated by this protocol.

Though any of the above mentioned protocol standards would certainly help reduce the time needed to interface new equipment, they are all too restrictive to be widely used as a basis for image communication. By placing constraints on physical connections, the Picker International and ACR-NEMA standards exclude numerous image-capable interfaces. Also, both of these standards limit their flexibility by restricting the size of records transmitted across an interprocessor link. By fixing or maximizing record sizes, these standards cannot accommodate all systems requiring an integral number of image lines per record, or systems that cannot tolerate the reassembly time needed to reconstruct image sections. Although the Philips standard does not have these restrictions, it does required the addition of control information to each record. As in the ACR-NEMA standard, the Philips standard adds overhead to each record, which may cause the protocol to fail to meet speed and throughput requirements. Furthermore, the added control information may not even be necessary in many imaging systems. Finally, none of these standards specifically address the problem of initiating and controlling operations on various types of imaging systems. Hence, it is the object of the present invention to provide a less restrictive, more flexible, image-capable protocol that can keep device interfaces regular, eliminate customization of control software, and support interprocessor communications at a low level.

SUMMARY OF THE INVENTION

The object is achieved according to the present invention by providing an image-capable communication system having first and second processors each of the processors containing modules, including a communication module, a plurity of higher level service modules connectable with the communication module, and one or more lower level modules connected to the communication module and to a physical communication channel connected between respective lower level modules in the first and second processors. The communication module operates according to an image-capable communication protocol whereby each of the higher level service modules in the first processor has a corresponding peer module in the second processor, and the communication module is connected with only one of the higher level service modules at a time, thereby avoiding overhead associated with multiplex connections to the communication module. According to another feature of the communication protocol, the communication module implements three types of commands; internal control, utility control, and status exchange commands. The internal control command regulate all aspects of communications control internal to the communication control module. The utility control commands allow higher level modules to exert external control over the communication module, and to solicit communication activity from a peer module in the other processor. Status exchange commands allow the first and second processors to communicate the status and configuration of their respective higher level modules.

According to a further feature of the image-capable communication protocol, prior to transferring image data, a line of communication is established between the respective communication modules in the first and second processors by executing a three-way handshake to exchange status information between higher level sender and receiver modules. Further, when transferring image data initialed by the sender, the communication module in the sending processor receives a buffer address, buffer size, and time out period from the higher level sending module. The communication module initiates a timer for a period equal to one-half of the time out period and waits for a ready indication for a lower level module.

If a ready indication is received prior to time out of the timer, the communication module transmits the data in the specified buffer address over the link. If the timer times out prior to receipt of a ready indication, or prior to completion of the transmission of the date, the communication module initiates a timer for the remainder of the specified time out period, and sends a ready to send message to the receiving processor. If a clear to send message is received, the communication controller waits for a ready indication from a lower level module, and restarts the data transmission when the ready indication is received. If the second timer times out before completing the data transmission, the communication module returns a time out error signal to a higher level module in its own processor. When a transfer of data is initiated by the receiving processor, the time out and error reporting are similar.

DETAILED DESCRIPTION OF THE INVENTION

A GENERAL PROTOCOL FOR IMAGE-CAPABLE INTERPROCESSOR LINKS

Figure 1:
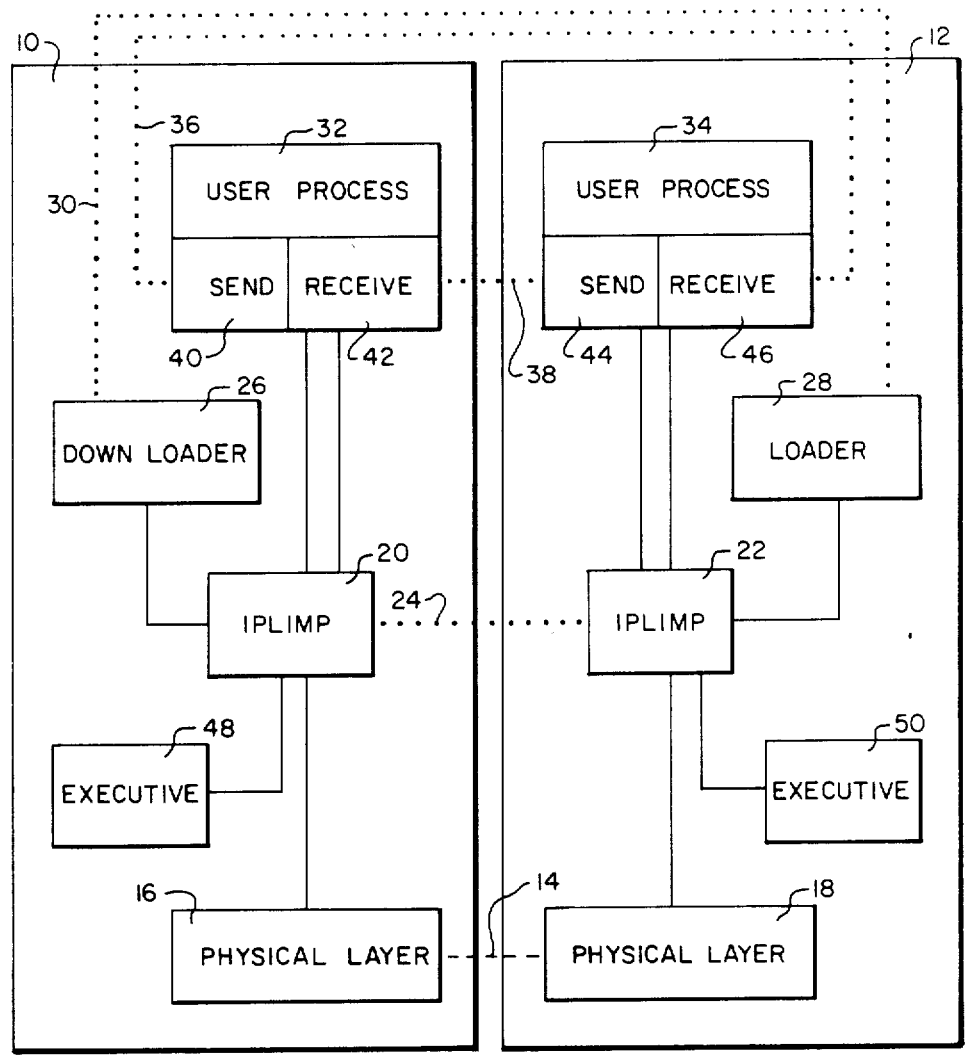
FIG. 1 is a schematic diagram of a communications system implementing the image-capable interprocessor link communication protocol according to the present invention.

The following describes a general purpose, flexible, image-capable interprocessor link communications protocol that provides a foundation for image-capable communications. This protocol, referred to herein as IPLIMP, an acronym for Interprocessor Link Image Model Protocol, was designed to limit the customization needed to implement image communications systems. In so doing, IPLIMP does not provide routing, flow control, process naming, or other networking functions. Instead, IPLIMP is limited in scope to the low level services required by interfaces desiring image-capable communications. As such, IPLIMP is concerned with the control and operation of a particular set of image-capable interprocessor link architectures.

CHARACTERISTICS

In order to serve as a foundation for image-capable communications, IPLIMP is designed to be adaptable to most interface architectures. Regardless of the application, the use of IPLIMP for low level ink control will not significantly decrease the performance of any underlying protocol layers. That is, IPLIMP will not degrade the performance of the physical devices or software modules it directs. This adaptability is possible since IPLIMP was organized to minimized overhead while maintaining flexiblity. The various characteristics of IPLIMP that permit its application to numerous image-capable systems are listed below in table 2. Of course, the image-capable communications requirements listed in table 1 are also provided by IPLIMP.

TABLE 2

| IPLIMP CHARACTERISTICS |
| --- |
| 1. DOES NOT SEGMENT MESSAGES |
| 2. DOES NOT INTERNALLY BUFFER MESSAGES |
| 3. DOES NOT ENCAPSULATE MESSAGES |
| 4. PROVIDES SIMPLE ERROR DETECTION AND REPORTING |
| 5. REQUIRES UNDERLYING SEGREGATION OF CONTROL AND DATA |
| 6. REQUIRES UNDERLYING INDICATION WHEN READY FOR DATA |
| 7. FACILITATES USER SPECIFIED TIME OUTS |
| 8. ACCOMMODATES VARIABLE MESSAGE LENGTHS |
| 9. HANDLES AN ARBITRARY NUMBER OF RECORDS |
| 10. OPERATES INDEPENDENTLY OF UNDERLYING SPEED |

IPLIMP limits overhead by omitting many potential low level communications features in favor of economized functionality and increased dependence upon the underlying layers. For instance, IPLIMP does not use message segmentation, which could be included to adjust record sizes between layers. Segmentation, or framing, consists of breaking streams of data into packets or frames before transmission. Following their reception, the packets are reassembled into the original data stream. This division and reconstruction of messages adds overhead to communications in a number of manners. First, segmentation requires the use of additional buffers to manipulate the data. However, moving data from one memory location to another takes time. Second, if there is a minimum delay incurred by each transmission, the total minimum delay for a series of packet transmissions will be greater than that of a single message transmission. Third, the processing time needed to divide and reassemble messages can be considerable. Finally, control information is often added to packets for transmission, which increases overhead.

Apart from segmentation, internal message buffering can also be used for throttling throughput. This buffering can be quite costly, both in terms of time and memory expense, especially when handling large image records. Similarly, the addition of control information by message encapsulation can be used independently of segmentation. While being useful for distinguishing message types and ensuring data integrity, message encapsulation increases overhead since the additional data must be transmitted, processed, and possible buffered. As with segmentation, internal message buffering and message encapsulation were not included in IPLIMP in order to limit overhead.

Another characteristic of IPLIMP that helps reduce overhead is the manner in which it handles errors. Typical error handling schemes involve the detection, correction, and reporting of errors. Such error handling functions require adding redundant data and coded information to each message. As stated before, overhead is increased by adding information to messages. Overhead also increases if messages are retransmitted when errors are detected. IPLIMP, however, simply monitors whatever operational information is provided by the underlying layers, and returns appropriate messages to the system and users. This simple approach to error handling ensures that the system and users are aware of any problems so that they may act accordingly. Furthermore, the system, users, and underlying layers can utilize, checksums, error correction codes, or any additional error handling mechanism deemed necessary. In this manner, IPLIMP operates independently of whatever error handling services are needed by the particular link. Thus, IPLIMP avoids the overhead associated with error handling schemes while allowing a variety of systems to build upon it.

As well as monitoring the return of operational information, IPLIMP requires notification when the underlying layers are ready to receive data. This notification can occur when the peer IPLIMP layer is ready, or when the underlying layers themselves are ready (i.e., when underlying buffers are available). Also, IPLIMP expects the underlying protocols to segregate interface control information from user data. This segregation can be accomplished by multichannel interfaces, programmable hardware links, or underlying encapsulation protocols. Rather than performing these services, IPLIMP provides streamlined functionality with minimized overhead. Thus, IPLIMP can either take advantage of physical systems that offer these services directly, or utilize additional protocol layers designed to provide these functions. In fact, these characteristics delimit the set of the interprocessor link architectures that IPLIMP can support. Serial programmed I/O interfaces with separate data and control channels, DR11-W-compatible parallel DMS interfaces, and various interprocessor links with appropriately designed protocol layers are some of the architectures suitable for IPLIMP control.

Besides limiting overhead, IPLIMP characteristically supports image-capable communications in a flexible manner. First, IPLIMP allows user to specify their own timeout intervals since all imaging equipment interfaces are not operated within the same time constraints. Next, IPLIMP permits users to transmit variable size records, as imaging systems have varying formats and record sizes. Finally, IPLIMP does not limit the number of records that a user transmits or the speed at which data is transferred. By providing such a degree of flexibility for its users, IPLIMP can be adapted to numerous image-capable applications.

Both flexibility and minimized overhead characterize the manner in which IPLIMP is able to support image communications systems. This support is made possible by providing a set of fundamental low level image-capable communications functions and services. Since systems are not equally able to tolerate the overhead associated with each communications feature, IPLIMP operations were streamlined to provide only the bare essentials for interprocessor link control. Full image-capable support can then be achieved by implementing IPLIMP functions and services as a basis for communications, and supplementing them with additional features, as dictated by the requirements of the interface to be supported.

OPERATIONS

The complete set of IPLIMP functions and services used to support image-capable interprocessor link communications are listed below table 3. The following material describes the operation of each IPLIMP feature, while a more detailed specification is given in appendix B. In order to understand better the operational description, a schematic diagram of a communication system implemnting IPLIMP is shown in FIG. 1.

TABLE 3
| IPLIMP FUNCTIONS AND SERVICES |
| --- |
| 1. ASSOCIATE/DISSOCIATE FUNCTIONS |
| 2. SEND/RECEIVE FUNCTIONS |
| 3. SEND COMMAND FUNCTIONS AND COMMAND HANDLING SERVICES |
| 4. INITIALIZATION AND DOWNLOADING/LOADING SERVICES |

In FIG. 1, internal connections are shown by solid lines, physical connection by a dashed line, and virtual connections by dotted lines. As shown in FIG. 1, an interprocessor link is formed by interfacing two processors 10, 12 together over some physical communication channel 14. This channel is depicted as a physical connection between physical layers 16, 18 in the processors 10, 12 respectively. It is these physical layers and connections that provide the raw communications facilities needed to transmit information between systems. By making this raw functionality available for use within the constraints of the host operating system executive, higher level protocols can be implemented to affect interprocessor communications. However, the raw communications functions provided by the specialized hardware and software within the physical layer are not necessarily the same on every system. One purpose of IPLIMP is to remedy this problem by presenting a uniform set of low level functions and services to higher level applications.

In order to do this, each IPLIMP implementation must access the particular physical layer and executive function available on the given processor. In other words, each implementation of IPLIMP is entirely system dependent. Furthermore, as described above IPLIMP requires that the underlying modules be capable of segregating control information from data, as well as indicating when they are ready to receive data. In this manner, IPLIMP can be internally connected only to those systems processing characteristics which make IPLIMP control feasible.

One IPLIMP 20 has been installed on a processor system 10, it forms a virtual connection 24 with the IPLIMP module 22 on its peer processor system 12. That is, though IPLIMP modules are not physically connected across the interprocessor link 14, they are connected via the underlying physical layers 16, 18. Hence, IPLIMP modules are able to exchange data by communicating with the underlying physical layers which are physically connected. In order to form such a virtual connection, a module on one system must have a peer, which is a corresponding module at the same level on the opposite side of the link. These modules then communicate by internally connecting to the underlying layers and executing appropriate lower level functions. For example, downloader 26 and loader modules 28 also form a virtual connection 30 across an interprocessor link. In this case, the downloader 26 is the module that transmits applications or additional protocol layers to its peer module 28 (the loader). On the other and, the loader 28 receives transmitted load data from across the physical link 14 and stores it in its processor memory. As shown in FIG. 1, the downloader 26 and loader 28 modules connect to their respective IPLIMP modules 20 and 22, then communicate by calling IPLIMP functions. Similarly, user processes 32, 34 can form virtual connections 36, 38 across an interprocessor link via their associated send and receive modules 40, 42, and 44, 46 respectively by associating with the IPLIMP modules 20, 22 and utilizing IPLIMP functions to transfer data. The protocol used to accomplish the exchange of data between peers is predetermined, and mutually agreed upon, by the corresponding peer modules on each system.

Before peer processes can communicate across a line 14 by using IPLIMP functions, they must become associated with the IPLIMP module on their host processor system 10, 12. An association, or internal connection, shown by solid line in FIG. 1, is a defined pathway for communications between service modules in a system. When modules become associated, they open a bidirectional line of communication, so that the underlying protocol can send information to the higher level module, as well as complete functions requested by the higher level protocol. IPLIMP provides associate and dissociate functions so that a downloader, loader, user process, or some other higher level module can establish and close such a line of communication to IPLIMP. However, only one process or module can be associated with IPLIMP at any given time, so there is no sharing of IPLIMP capabilities.

When issuing the IPLIMP associate function to commence communication with IPLIMP, the higher level protocol identifies send and receive processes to IPLIMP so that they may be notified whenever the peer system needs them. In this manner, a logical connection is formed between IPLIMP and the higher level protocol, allowing IPLIMP to notify the associated sender and receiver as needed. Such notification may take place in a number of manners. Generating a software interrupt, setting a semaphore, and making an entry into an event queue are all possible ways to inform a process that it is being asked to communicate. The method used by IPLIMP is entirely system dependent.

Conversely, the dissociate function is used by the associated protocol layer to erase the inter-layer pathway, thereby terminating its logical connection to IPLIMP. Once IPLIMP is dissociated from a higher level protocol, it is free to be associated with other processes. While it is not associated with a sender and receiver, IPLIMP can pass control information across the interprocessor link. However, IPLIMP is unable to honor requests by its peer system to exchange data without a line of communication to a higher protocol layer.

The associate and dissociate functions provide and ability to open and close lines of communications to IPLIMP, thereby enabling more flexible interaction with IPLIMP. After a line of communication has been established, associated processes access specific IPLIMP functions to exchange data across an interprocessor link 14. For example, when an associated send module wishes to send a block of data across the link, it invokes the send function, specifying a buffer address, a buffer size, and timeout period for the operation to complete within. Following its initiation, the IPLIMP send function starts a timer for half the user specified timeout period and waits for the lower level protocol to signal that the peer receiver is ready. Once the ready indication is received, the specified buffer is sent directly across the link. If the timer fires before the ready indication is received or the operation is completed, IPLIMP starts a timer for the remaining timeout period and sends a "ready to send" command word to the peer system. If a "clear to send" command word is received, IPLIMP can proceed to wait for the receiver ready indication and restart the data transmission. If the entire specified timeout period expires without obtaining the "clear to send" command word, receiving the ready indication, and completing the data transfer, then IPLIMP returns a timeout error to the associated send module.

Similarly, when an associated receiver module wishes to read a block of data from across the link, it issues the receive function, specifying a buffer address, a buffer size, and a timeout period for the operation to complete within. Once invoked, the IPLIMP receive function starts a timer for half the user specified timeout period, indicates its readiness to receive data, and attempts to fill the user buffer area with data from across the link. If the timer fires before the operation is completed, IPLIMP starts another timer for the remaining timeout period and sends a "ready to receive" command word to the peer system. After the peer responds with a "clear to receive" command word, IPLIMP proceeds to restart the data reception. If the entire specified timeout period expires without obtaining the "clear to receive" command word and completing the data transfer, then IPLIMP returns a timeout error to the receiver process.

As described above, both send and receive functions use command words to attempt to initiate data communications without letting the full timeout period elapse. The use of such command words, however, it not restricted to the internal operation of IPLIMP. In fact, IPLIMP permits the complete asynchronous control of an interprocessor link through a combination of internal and user specified command words. These control commands are well-defined 16-bit values which have been divided into the following groups: Internal Command Protocol (ICP), Utility Command Protocol (UCP), Status Response Protocol (SRP), and Status Exchange Protocol (SEP). By grouping the command words in this manner, interprocessor link control is organized into functional categories, each of which addresses a particular area of IPLIMP operations.

For example, IPLIMP uses ICP commands to maintain internal control. The commands used by the send and receive functions to wake up the peer system and grant clearance to transfer data are ICP commands. Additional ICP commands are used to indicate when a sender or receiver is not present in response to peer ready commands. Finally, ICP command words are defined for aborting operations, initiating a status exchange using SRP and SEP commands, and flagging illegal commands. Thus, there is an ICP command word available to help regulate every facet of internal IPLIMP communications.

The next group of IPLIMP command words was designed to be used as input the send command function available for higher level protocols to control IMPLIMP operations externally. When an associated process wishes to transmit control information across the link, it issues the send command function, passing IPLIMP the UCP command word to be sent and a timeout period, if appropriate, for a response. For instance, UCP command words are defined to allow higher level protocols to wake up their peer send and receive processes. Though IPLIMP may attempt to wake up a peer user process in the other processor during the execution of a send or receive function, an IPLIMP user may try to notify its peer process even before it initiates a data transfer. In this manner, IPLIMP users can synchronize their interaction without having to wait for variable timeout time to elapse. Accompanying the two commands to notify adjacent proceses are UCP commands for requesting to download an adjacent system, requesting a load module from an adjacent system, and giving the go ahead to send a data block containing further control information. By using the send command function to transmit the various UCP commands, higher level protocols can exert external control over IPLIMP operations and solicit IPLIMP activity on the peer system.

The remaining two command groups are used internally by IPLIMP to complete the exchange of status initiated by an ICP status request command. A status exchange protocol is used by IPLIMP to obtain information about the operating characteristics of the adjacent system. When IPLIMP first connects to the underlying protocol layers, it attempts to send a status request to its peer. In response to the ICP status request, the peer IPLIMP module sends back an SRP command word containing the system status. Similarly, the initiating IPLIMP module returns an SEP command word, in order to exchange status, following the reception of an SRP command word. This transfer of status information is needed to convey specific system characteristics before enabling full interprocessor communications.

If IPLIMP did not provide such a mechanism for exchanging status, each system would have to make assumptions about the other, which could ultimately lead to a complete communication failure. For example, suppose a link has been operational for quite some time and one of the systems is powered down, then replaced by a processor with different characteristics (i.e., a loadable microcomputer is replaced by a multiuser multitasking minimcomputer). Once the new system is powered up, the adjacent system must be informed of its capabilities before inappropriately attempting system downloads or remote control. Not only can functions fail, but others may never be tried, simply because one system may underestimate the capabilities of the other. Furthermore, imagine if one processor disables communication while the adjacent system is off-line, but is never informed of the availability of the link when the adjacent processor resumes operation. IPLIMP avoids these sticky situations by initiating the simple exchange of SRP and SEP command words while synchronizing operations, immediately upon its connection to the lower level protocols.

IPLIMP's implementation of SRP and SEP commands for communication synchronization is derived from the three-way handshake technique designed to handle delayed or lost messages and acknowledgements. A three-way handshake usually consists of a series of three messages in which each successive message contains response data, a message number, and the number of the message being acknowledged. Since the messages in the series must be acknowledge sequentially, any message containing an acknowledgement number that is out of order can be handled without confusion. In addition to acknowledging messages by number, the three-way handshake strictly defines message content, so that once the data exchange is initiated, it will either be completed or rejected within the next two transfers. Thus, a synchronized data exchange is achieved without deadlocks, infinite loops, loss of data, or similar problems associated with invalid message sequences. Although IPLIMP does not employ a message numbering scheme, the SRP and SEP commands are structured to provide a reliable three-step exchange of status, regardless of which system initiates the exchange or when it is requested.

Though the preceding discussion of the four IPLIMP command groups has left their physical values to be defined in appendix B, it is important to note that it is the definition of these command groups, the values chosen, and the ways in which they are handled that provide some of the key distinguishing points of IPLIMP. For example, referring to appendix B, section B-1 it can be seen that the difference between the status response command and the status exchange command is one bit, thereby simplifying the operation of the IPLIMP module to detecting only the status of one bit to distinguish between the two commands. Similarly, by testing only the high order bit, the other commands are easily distinguished. Even the manner in which IPLIMP relies upon lower level protocols to segregate these command words from normal user data contrasts with typical link control techniques. However, once identified, control commands are handled by IPLIMP as they would be by most link protocols. Unlike data that is communicated via the send and receive functions, reception of a command word is more of an asynchronous event. Since the lower levels take care of identifying the command words, IPLIMP supplies a command handler to which the lower level protocols pass commands as they are received. Once activated, the command word handler checks command validity, performs any required IPLIMP operations, and returns information, if necessary, by sending an appropriate ICP command word. As with any control protocol, the command handler must execute as quickly and efficiently as possible in order to ensure that critical functions are immediately completed.

For instance, the "request to download" and "request for load" UCP command words serve to initiate IPLIMP downloading/loading services. These services may be required by a system that needs a load module to function properly. In order to facilitate the downloading of a system, the IPLIMP command handler quickly engages the download/loading services upon the valid reception of one of these commands. A download protocol is then used to handle the communication between a downloader process on the system sending the load module and a loader process on the system receiving the load module. Though somewhat higher level in functionality, such a download protocol is defined as an integral component of IPLIMP. As illustrated in FIG. 1, this download protocol 26 resides at an intermediate level between normal user processes 32 and IPLIMP itself 20. Since the download protocol is so closely associated with IPLIMP, it is included herein with the IPLIMP specification.

The IPLIMP download protocol was defined to support systems that cannot archive their own user applications. It is worth noticing, however, that the implementation of these downloading services is completely optional and dependent upon the functionality desired by the systems using the interprocessor link. For instance, if a system requires the ability to be loaded across the link, then it needs a loader process that adheres to the prescribes download protocol. On the other hand, if a system is relied upon to transmit loads across the link, then it needs the corresponding downloader module. In either case, the IPLIMP download protocol described a methodology for loading systems across an interprocessor link.

A downloader process is either activated by the local system when it wants to send a load module to a peer or by IPLIMP upon reception of a UCP "request for laod" command word. If a downloader has been activated by IPLIMP, it must issue the send command function to transmit a UCP "send control block" command word, which signals the peer loader process to continue. Next, the downloader issues the receive function to read a filename block (FNB) from the loader. An FNB is a 64-byte block containing an ASCII character string which is used to specify a load module. Such a specification may be represented differently from system to system due to the disparity between file systems. If the downloader was instead activated by the local system, the file specification for the load module must be passed internally to the downloader process. Conversely, a loader process is either activated by the local system when it wants to obtain a load module from a peer or by IPLIMP upon receiving a UCP "request to download" command word. If loader operation was initiated by the local system, it issues the send command function to transmit a UCP "request for load" command word across the link. When the downloader replies with the UCP "send control block" command, the loader issues the send function to send the FNB. Finally, the loader hibernates, waiting to be awakened by IPLIMP upon receiving a "request to download" command. The downloader sends this command only after it has located the file containing the load module (whether specified by the local system or an FNB), and it is ready to being downloading data. At this point, the download protocol continues as if the downloading system had requested to download its peer.

Before the actual downloading can being, however, the systems involved must exchange critical information describing the pending load. This handshake is initiated when the downloader issues the send function to transmit a load control block (LCB) to the peer loader. An LCB is a 16-byte block containing four 32-bit fields, each representing a 32-bit integer value stored low-order bit first. The first field (load address) specifies the memory location where the load module is to be stored. The next field (load size) contains the length of the load module in bytes. The third LCN field (fragment size) is the size in bytes of the fragments that will be transferred across the link in succession until loading is completed. The size of the last fragment may be somewhat less than this size if there is not enough load module data remaining to form a full fragment. The last LCB field (transfer address) specifies the memory location where the execution of the load module begins. These four LCB fields are filled from information obtained by the downloader from the load module file. Once the loader has received the LCB, the data is examined and an LCB acknowledgement (LCB ACK) is created to approve or reject the download request. An LCB ACK is 2 bytes in length with bits set to represent reasons for download rejection, such as illegal load address, illegal load size, illegal fragment size, or illegal transfer address. Following the successful exchange of an LCB and an LCB ACK, with loader approval, downloading may proceed. The load module is then transmitted from the downloader to the peer loader, fragment by fragment, through the use of the send and receive functions.

All the details necessary for implementing the IPLIMP protocol and the DOWNLOAD protocol are contained in appendix B.

Figure 6:
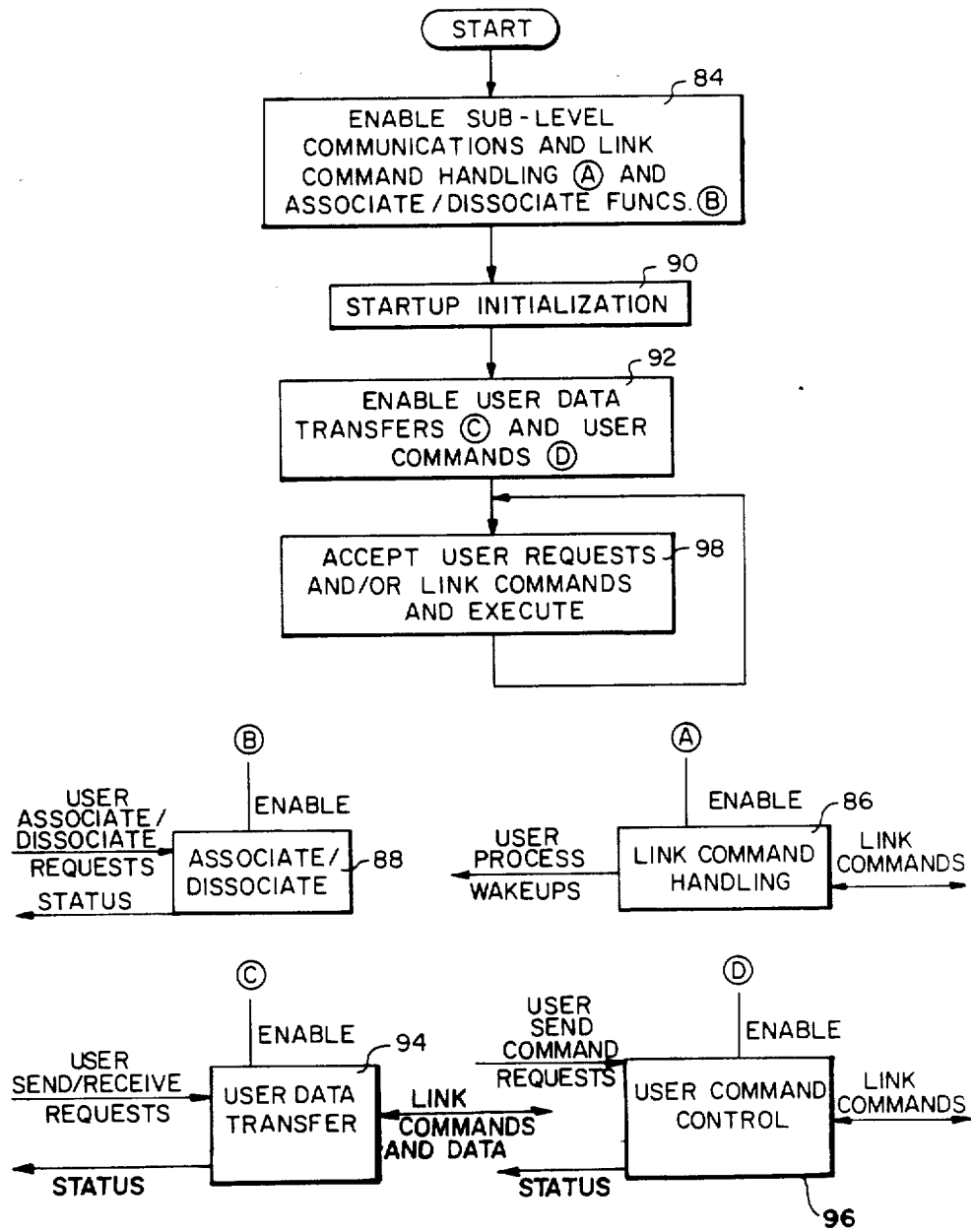
FIG. 6 is a block diagram of the image-capable interprocessor link communication protocol according to the present invention.

A block diagram of the IPLIMP communication module implemented by the pseudo-code program description in appendix B is shown in FIG. 6. Referring to FIG. 6, upon start-up 84, IPLIMP enables sublevel communications, link command handling by enabling link command handling block 86 and associate/dissociate functions by enabling associate/dissociate block 88. The link command handling block 86 receives link commands which direct it to either send appropriate link command responses or initiate user process wake ups. The associate/dissociate block 88 receives user associate/dissociate requests and returns appropriate status to the user. Next IPLIMP executes start up initiatization 90 by requesting status via a link command and proceding through a status response and status exchange three-way handshake, this function is executed by the link command handling block 86.

IPLIMP then enables user data transfers by enabling user data transfer block 94 and enables user commands by enabling user command block 96. Finally, IPLIMP enters a loop 98 wherein it accepts user requests and/or link commands and executes these commands accordingly. The user data transfer block 94 accepts user send/receive requests, sends/receives appropriate link commands and/or user date over the physical channel, and returns status to the user.

STANDARDS

As described above, by utilizing IPLIMP, systems can expect to maintain low level image-capable communications compatibility with other IPLIMP compliant systems. However, IPLIMP is just one of many available communications protocols, each of which has been optimized for a particular set of applications. Undoubtedly, this situation poses problems for connecting systems that do not adhere to the same communications guidelines. In fact, the growing number of proprietary rotocols has prompted the push for the development of standard communications rules. The steps taken in this direction have been divided along two paths: acceptance of "de facto" standards and use of the International Standards Organization (SIO) proposals.

Since it will be difficult to arrive at a consensus as to what proprietary protocol is the "de facto" standard for communications, it is reasonable to adhere to a standard methodology for designing systems. Using a layered design reduces complexity by associating groups of functions with particular levels of control, thereby creating a modular architecture which can be easily modified or adapted to at any level. To provide such a standard, ISO has developed the Open Systems Interconnect (OSI) reference model which describes a general layered communications architecture. As established communications protocols such as SNA and DECNET have begun to adapt themselves to this model, support for ISO standards has increased. Due to the growing importance of the ISO OSI reference model, it will now be described how IPLIMP fits into the standard layered structure of the ISO OSI model.

The ISO OSI reference model provides a framework for the development of communications architectures as a basis for simplifying the interconnection of systems. Acting as a communications standard, the ISO OSI model offers a set of guidelines for classification of layers in terms of functionality at seven distinct levels.

Figure 2:
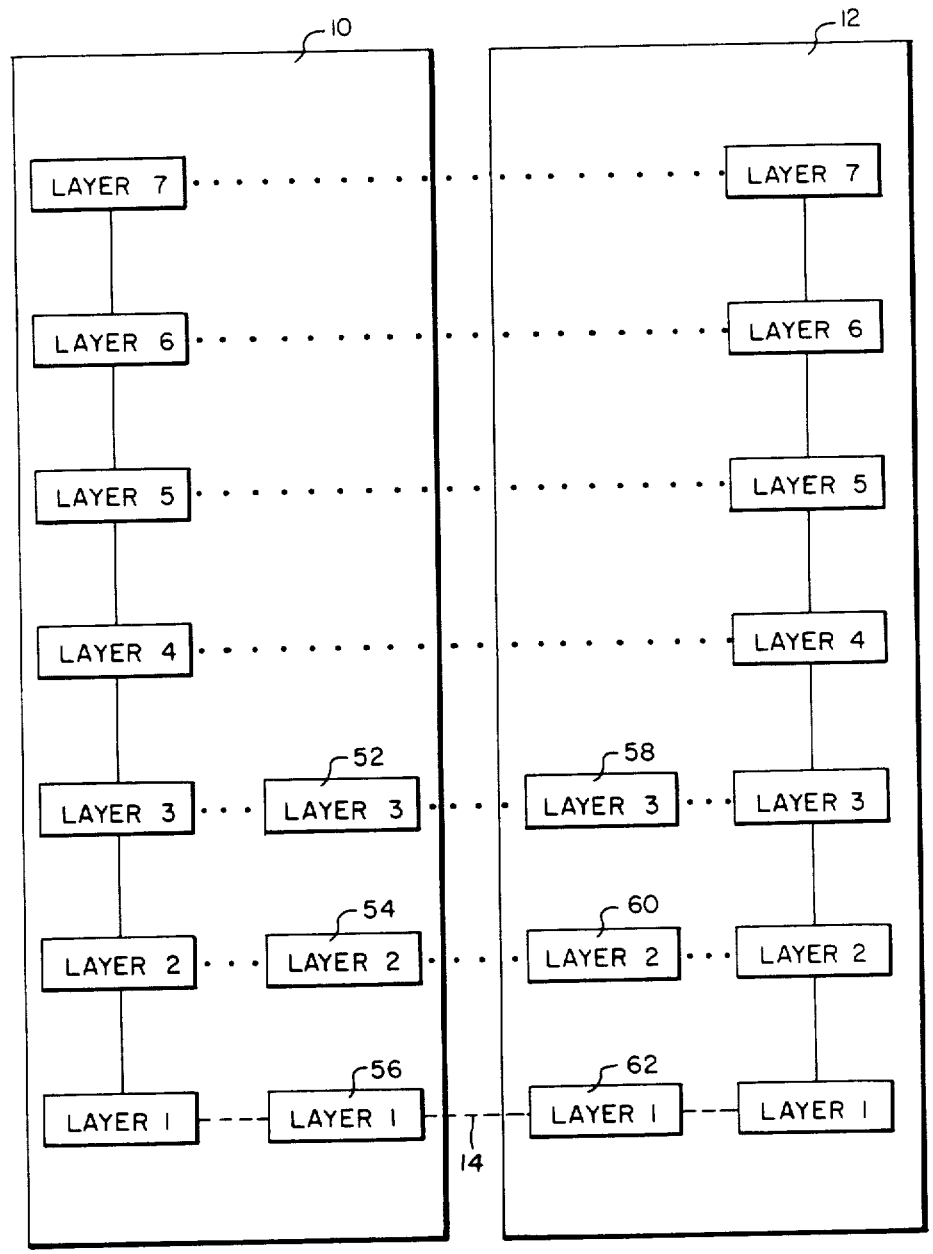
FIG. 2 is a schematic diagram of an ISO OSI standard communication system, useful for describing the implementation of the present invention in such a standard communication system.

A schematic diagram of the ISO OSI communications model is shown in FIG. 2, where solid lines represent internal connections, dotted lines present virtual connections, and dashed lines represent physical connections. The two processor systems 10 and 12 are connected by a physical link 14. As shown in FIG. 2, the three lowest layers (physical [layer 1], data link [layer 2], and network [layer 3]) specify an interface chain across a communications subnet, while the remaining four layers (transport [layer 4], session [layer 5], presentation [layer 6], and application [layer 7]) define an end-to-end system interface. According to the OSI model, the subnet consists of a series of intermediate relaying systems 52, 54, 56, 58, 60, and 62 which use only the lower 3 layers of functionality in order to route information between the end nodes. This exemplifies how ISO OSI based systems implement whatever layers, or functions within layers, they needed to meet specified communications requirements. The functions that ISO has grouped together for each OSI layer are listed in table 4.

TABLE 4

| ISO OSI PROTOCOL LAYERS | |
|---|---|
| LAYER | FUNCTIONS |
| 1 - PHYSICAL | physical characteristics (electrical & mechanical) voltage & time specs signalling requirements connection type number of connections |
| 2 - DATA LINK | link interconnection & control synchronization physical error handling data encapsulation/framing bit/character stuffing |

TABLE 4-continued

| ISO OSI PROTOCOL LAYERS | |
|---|---|
| LAYER | FUNCTIONS |
| 3 - NETWORK | flow control message segmentation subnet to host interface (datagram service vs. virtual circuits) routing subnet flow control accounting services congestion prevention deadlock prevention |
| 4 - TRANSPORT | connection multiplexing end-to-end flow control connection establishment connection termination process naming |
| 5 - SESSION | system access verification management services crash recovery synchronization services transport error handling |
| 6 - PRESENTATION | security (data encryption) data compression terminal handling file transfer |
| 7 - APPLICATION | user defined protocols |

Of the functions listed in table 4, those that are assigned to the data link layer are most closely associated with the services that are performed by IPLIMP. However, as indicated in table 2, IPLIMP does not perform such data link functions as segmentation or encapsulation. Furthermore, IPLIMP relies on some lower level protocol to provide services such as data and control segregation. The ISO OSI model, on the other hand, accommodates message segregation with data link framing services or specialized physical signalling. While the ISO OSI model does not directly address the problem of image-capable communications in any of its layers, IPLIMP describes a basic set of data link functions that can support the transfer of images. Therefore, though it does not support every ISO OSI data link function, IPLIMP can be treated as a data link protocol. In that regard, IPLIMP can be combined with other data link functions, if necessary, to characterize the data link protocol for a given application. In a similar fashion, additional layers can be added to the customized data link layer (layer 2) in order to characterize an entire communications architecture. In this manner, IPLIMP is compatible with the ISO OSI layered architecture at the data link level.

IMPLEMENTATION DESCRIPTIONS

By using IPLIMP as a basis for communications, several systems have been built that are able to support image-capable operations successfully. In fact, three interprocessor link configurations were implemented in order to verify IPLIMP capabilities. In each of these three configurations, IPLIMP was employed as a control facility for DR11-W compatible interface hardware. DR11-W-type interfaces were selected because they possess the underlying features required for IPLIMP support. Among the DR11-W characteristics that can help accommodate the adaptation of IPLIMP are DMA parallel data transmission, asynchronous control word transmission, error checking, and status bit notification when the peer receiver is ready for data. The actual interfaces, were manufactured by Digital Equipment Corporation as standard off-the-shelf communications components.

AN INTRAPROCESSOR LINK

Figure 3:
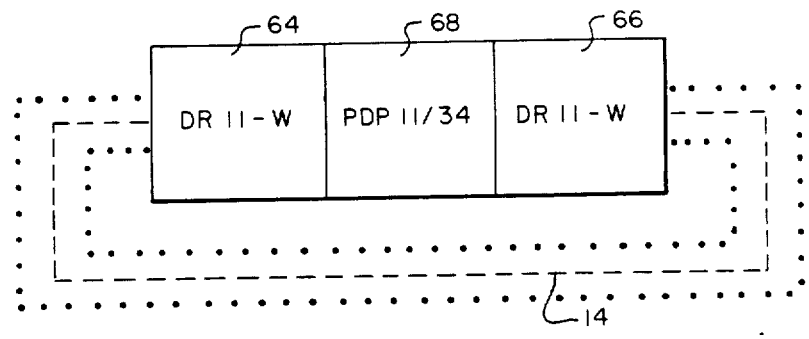
FIG. 3, 4, and 5 are block diagrams of hardware configurations employed to demonstrate the communication photocol of the present invention.

The first IPLIMP compliant system, which is shown in FIG. 3, was created by connecting together two DR11-W 16-bit parallel DMA interface cards 64, 66 that were plugged into the same PDP-11/34 minicomputer 68. The link 14 connecting the interface cards 64, 66 was a standard multi conductor wire ribbon. The initial implementation was centered around a DR11-W device driver written for the RSX-11M operating system running on the PDP-11/34. While normal RSX-11M driver mechanisms were used to provide a callable set of IPLIMP functions, a method for aborting IPLIMP operations, and an internal IPLIMP command word handler, special code was written to synchronize the timing of IPLIMP events and to set local event flags for notifying user processes. See RSK-11M Guide to Writing an I/O Driver Digital Equipment Corporation, 1981. The driver code was written in the PDP-11 assembly language (MACRO-11), since it is the language best suited for writing efficient RSX-11M system level software.

Though the driver code was written in MACRO-11, a test program was written in FORTRAN-77 to demonstrate that higher level programming languages can utilize the MACRO-11 coded driver functions. In order to exercise the intraprocessor link and verify IPLIMP functionality, the test program allowed users to select various combinations of send and receive wait states to perform a loopback test across the link. This loopback test consisted of creating records, sending data across the link, comparing the data received with those sent, sending data back, recomparing, and compiling results. Use of this loopback test was important during the development of the IPLIMP specification as well as the DR11-W device driver.

Though the intraprocessor link configuration and its associated software were vital during the initial stages of development of the IPLIMP specification, they did not exercise every IPLIMP function and feature. However, it was in part due to the fact that it did not required complete IPLIMP support that the intraprocessor link was chosen as the first IPLIMP prototype. By utilizing a single processor for development and testing, the bulk of the IPLIMP protocol was implemented and verified with approximately half the effort of that needed for conventional multi-processor interprocessor link communications systems. Also, since there was no requirement for transferring additional protocol layers between processors, there was no need to employ IPLIMP downloading/loading services. Thus, this first step toward proving IPLIMP functionality was accomplished by keeping both hardware and software interfacing, debugging, and modification as simple as possible.

INTERPROCESSOR LINK #1

Figure 4:
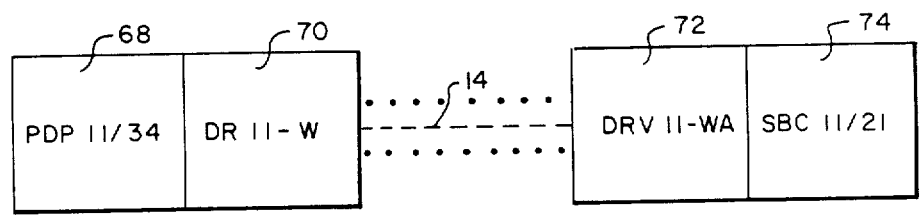

The second step toward providing IPLIMP functionality was to support an interprocessor link between two systems, using the full set of IPLIMP features. This was achieved by expanding upon the initial device driver and test program written for the first prototype. In order to minimize the time needed develop the second prototype, as much of the first prototype was used as possible. Referring to FIG. 4, this was accomplished by connecting a third DR11-W interface card 80 on the PDP-11/34 computer 68 to a compatible DRV11-WA interface module 72 on an SBC-11/21 (FALCON) microcomputer 74. In this manner, the second prototype was able to utilize the initial RSX-11M implementation of IPLIMP, leaving the bulk of the development to the FALCON system. Originally, the FLACON used a DRV11-B interface module to communicate with the PDP-11/34, but since the DRV11-B needed hardware modifications in order to work properly, the more compact, fully functional DRV11-WA was installed.

The development required for the FALCON system consisted mainly of writing a ROM-resident executive based on IPLIMP in MACRO-11. This executive included a loader module for obtaining applications software that could not be stored on the FALCON. Thus, the corresponding downloader utility was required for the PDP-11/34 which could be activated either by the DR11-W driver upon receiving a load request from the FALCON, or by a preloader utility upon accepting a download command from a terminal. A test procedure, similar in functionality to that of the loopback link test, was written in FORTRAN-77 for the PDP-11/34, while a downloadable peer process was written in MACRO-11 for the FALCON.

INTERPROCESSOR LINK #2

Figure 5:
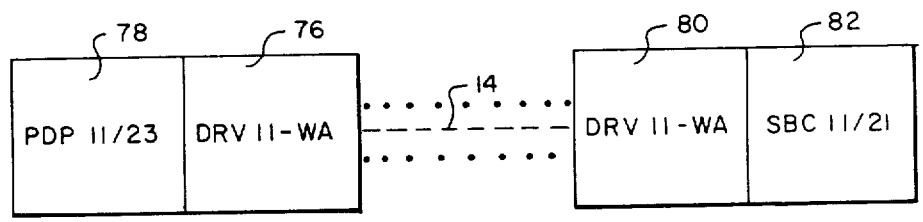

Comprehensive verification of IPLIMP functionality was completed on a third prototype which featured a third type of CPU and another interprocessor link combination. The final IPLIMP compliant prototype, shown in FIG. 5, was formed by connecting a DRV11-WA interface board 76 residing on a Q-BUS based PDP-11/23 microcomputer 78 to another DRV11-WA interface 80 on a second FALCON system 82. As with the previous interprocessor link implementation, the DRV11-B interface originally used on the FALCON was replaced with a DRV11-WA. Since the PDP-11/23 microcomputer operated under RSX-11M, IPLIMP support was obtainable by adding conditional-code to the DR11-W driver for DRV11-WA interface control. Aside from what resulted in minor additions to the DR11-W driver, identical software was used on both the second and third IPLIMP prototype interprocessor links. Thus, by using the UNIBUS based PDP-11/34 and the Q-BUS based PDP-11/23 and FALCON systems, UNIBUS to UNIBUS (interprocessor link), UNIBUS to Q-BUS (interprocessor link #1), and Q-BUS to Q-BUS (interprocessor link #2) image-capable communications systems were designed to operate under IPLIMP control.

Appendix A contains a glossary of terms used herein.

A complete description of IPLIMP and DOWNLOAD protocols is presented in appendix B, written in pseudo-code. The pseudo-code, along with the associated data structure definitions and value assignments, serves as the primary specification to enable a skilled programmer to implement IPLIMP in any appropriate communication system. Although this model is presented in a form which is optmized for clarity of presentation, actual IPLIMP implementations will undoubtedly exhibit more complexity, since they will be adapted to the architectural constraints imposed by the particular interprocessor interfaces. Within this context, it is important to realize that adhering to the structure of this model is not mandatory for achieving a correct IPLIMP implementation. Rather, the structure of this model is useful as an aide to understanding the required behavioral aspects of the internally and externally initiated IPLIMP functions. Furthermore, the use of the pseudo-code notation for this model does not imply that IPLIMP must be implemented in software. Therefore, an actual IPLIMP implementation may be a complex structure consisting of software, firmware, and/or hardware modules.

As an aide to following the IPLIMP pseudo-code description in appendix B, a number of conventions are listed in tables B-1, B-2, and B-3. The various symbols and keyboards described in the tables are not required IPLIMP mnemonics, though they do provide a consistent terminology for describing functions, data, and operations.

A computer program listing in MACRO-11 language for implementing the IPLIMP and DOWNLOAD protocols in a DEC RSX-11M operating system in a DEC PDP11 computer, is included in appendix C. This is the final program that resulted from the imlementations described above with reference to FIGS. 3, 4, and 5.

Appendix D is a users guide prepared to accompany the IPLIMP implementation contained in appendix C.

ADVANTAGES

IPLIMP, an image-capable interprocessor link communications protocol, has been designed to provide flexibility with a minimal amount of overhead. At a level comparable to the ISO OSI data link layer (layer 2), IPLIMP defines the basic set of functions and services needed to facilitate image communications over an interprocessor link. Use of such a protocol improves the development of imaging systems. For example, following the development of the second prototype system described above, little modification was necessary when changing processors to form the third prototype. Since this is a simple case, imagine if instead of replacing a FALCON host, an image digitizing unit was used to replace the FLACON. In this case, the image digitzer would have to be designed to follow IPLIMP, as was the FLACON, and test procedures would have to be designed to support the comparison of data sent by the digitizer when scanning a known image. Similar changes would be expected if changing from the image digitizer to an image printer or display unit. Notice that neither situation requires modification to the IPLIMP layer. Compare this, however, to the customization required to develop the customized interfaces of the prior art. The same advance changes made to a previously customized system would necessitate the development of new interface control protocols, user utilities, and test procedures, due to the tailoring of interfaces to specific device needs rather than designing links for general image transfer functionality.

Thus, with IPLIMP, there is reduced design complexity and customization, as less attention needs to be paid to the host when interfacing new devices. Several avenues are available to achieve the full benefit of IPLIMP services. First, DR11-W-compatible IPLIMP implementations can be developed for additional operating systems in order to build a base of common IPLIMP support for imaging devices, for example, a VMS implementation or a Motorola VMEbus system implementation. Second IPLIMP support can be provided for additional physical subsystems such as a simple dual-mode base band channel or a fiber optic link (uni-fiber or multi-fiber). Building upon this base of IPLIMP support, routing and flow control protocols can be added to support complete image-capable network services. Of course, consideration must be given to image-capable communications requirements if such protocols are developed.

For low level interprocessor link applications, IPLIMP defines a flexible protocol adaptable to various speed requirements on several hardware architectures. With a common basis for image communications, imaging subsystems become more transportable. For higher level communications between multiple imaging systems, IPLIMP provides a callable set of functions to affect the transfer of images between adjacent points.

I claim:

1. In an image-capable communications system having first and second processor connected by an interprocessor link, said first and second processors including a communication module, a plurality of higher level service modules, and one or more lower level modules connectable to said communication module and to a physical communication channel, an image communication protocol method for transferring image data from one of said processors (sender) to the other (receiver), comprising the steps of:
 (a) prior to transferring image data, establishing a line of communication by executing a three-way handshake to exchange status information between the sender and receiver;
 (b) when transferring image data initiated by the sender processor, the sender communication module executing the steps of,
   (1.) receiving from a higher level service module a user specified buffer address, buffer size and time out period for completing the transfer of date,
   (2.) initiating a timer for a period equal to one-half the user specified time out period;
   (3.) if a ready indication is received from a lower level module prior to time out of the timer, transmitting the data in the specified buffer over the link;
 (4.) if the timer times out prior to receipt of a ready indication, or prior to completion of the transmission of the data in the specified buffer address, initiating a timer for the remainder of the user specified time out period, and sending a ready to send message to the receiver; if a clear to send message is received from the receiver, waiting for a ready indication, and restarting data transmission when the ready indication is received,
   (5.) if the entire user specified time out period expires prior to completing the transmission, returning a time out error signal to a higher level service module in the sender processor;
 (c) when transferring image data initiated by the receiver processor, the receiver communication module executing the steps of,
   (1.) receiving a user specified buffer address, buffer size and time out period for completing the transfer of data from higher level service module,
   (2.) initiating a timer for a period equal to one-half the user specified time out period,
   (3.) indicating readiness to receive data, and attempting to fill the user specified buffer with data from the sender,
   (4.) if the timer times out before the specified buffer is filled, starting a timer for the remaining user timeout period and sending a ready to receive command, after receiving a clear to receive command from the sender, restarting the attempt to fill the buffer, (5.) if the entire user specified time out period expires without obtaining a clear to receive command and completing the data transfer, returning a time out error to a higher level service module in the receiver processor.

2. An image-capable communication system comprising:
- (a) first and second processors, each of said processors containing modules, including a commuincations module, a plurality of higher level service modules such as user process modules, down loader and loader modules connectable with said communications module, and one or more lower level modules connected to said communications module;
- (b) a physical communication channel directly connected between respective lower level modules in said first and second processors;
- (c) each of said higher level service modules in said first processor having a corresponding peer module in said second processor;
- (d) said communication module operating in accordance with a protocol in such a manner that it is connectable with only one of said higher level service modules at a time, thereby eliminating overhead associated with multiplex connections to a communication module.

3. In an image-capable communications system, having first and second processors, each of said processors containing modules, including a communications module, a plurality of higher level service modules connectable with said communications module and one or more lower level modules connectable with said communications module, and connected to a physical communication channel between the first and second processors, an image communication protocol method comprising the steps of:
- (a) connecting only one of said higher level service modules to said communications module at a time; and
- (b) said communications module implementing a control command from one of three types of control commands,
  - (1.) internal control commands for regulating communications internal to the communications module,
  - (2.) utility control commands for allowing higher level modules to exert external control over the communications module, and solicit communications activity from a peer module in the other processor,
  - (3.) status exchange commands for allowing the processors to communicate the status and configuration of their respective higher level modules.

4. The image communication protocol method claimed in claim 3, wherein said utility control commands include an associated command useful by a higher level service module to establish a bidirectional line of communication between the higher level service module and the communication module, and a dissociate command useful by the higher level service module to erase said bidirectional line of communication.

5. The image communication protocol method claimed in claim 4, wherein said higher level service module, when issuing an associated command to said communication module, also identifies a send and receive module to said communication module.

6. The image communication protocol method claimed in claim 3, wherein said status exchange commands are employed to execute a three-way handshake to exchange status and configuration information upon first establishing a communication link between the first and second process, the status exchange commands being structured such that message numbering is not required.

7. The image communication protocol method claimed in claim 3, wherein said utility control commands include commands useful by a higher level service module to wake up its peer service module in the other processor.

* * * * *